Nov. 20, 1956 H. W. DUDLEY ET AL 2,771,509

SYNTHESIS OF SPEECH FROM CODE SIGNALS

Filed May 25, 1953 7 Sheets-Sheet 1

INVENTORS
H. W. DUDLEY
C. M. HARRIS
BY Harry C. Hart
ATTORNEY

Nov. 20, 1956 H. W. DUDLEY ET AL 2,771,509

SYNTHESIS OF SPEECH FROM CODE SIGNALS

Filed May 25, 1953 7 Sheets-Sheet 2

INVENTORS
H. W. DUDLEY
C. M. HARRIS
BY Harry C. Hart
ATTORNEY

SYNTHESIS OF SPEECH FROM CODE SIGNALS

INVENTORS
H. W. DUDLEY
C. M. HARRIS
BY Harry C. Hart
ATTORNEY

INVENTORS
H. W. DUDLEY
C. M. HARRIS
BY Harry C. Hart
ATTORNEY

INVENTORS
H. W. DUDLEY
C. M. HARRIS
BY Harry C. Hart
ATTORNEY

INVENTORS
H. W. DUDLEY
C. M. HARRIS
BY Harry C. Hart
ATTORNEY

INVENTORS
H. W. DUDLEY
C. M. HARRIS
BY Harry C. Hart
ATTORNEY

United States Patent Office 2,771,509

Patented Nov. 20, 1956

2,771,509

SYNTHESIS OF SPEECH FROM CODE SIGNALS

Homer W. Dudley, Summit, N. J., and Cyril M. Harris, New York, N. Y., assignors to Bell Telephone Laboratories, Incorporated, New York, N. Y., a corporation of New York Application May 25, 1953, Serial No. 357,062

8 Claims. (Cl. 179—1)

This invention relates to speech-producing systems and particularly to the production of speech with a smooth gradation from one sound to another.

An object of the invention is to produce speech from fingersing operation by an unskilled and untrained operator.

Another object of the invention is to convert transmitted telegraph signals to understandable speech, thus realizing for speech the natural advantages of telegraphy over telephony in reduced frequency band width required for transmission and in improved signal-to-noise ratio.

Another object of the invention is to translate from the printed word to the spoken word.

The invention makes use of a standardized speech with clearly spoken sounds which are set up at the receiver station and so not subject to degradation in transmission. It provides a maximum of intelligibility because well-spoken sounds are selected and because the listener more readily becomes familiar with speech produced by the same speaker each time than with speech produced by a different speaker each time.

In the practice of the invention, at a sending station a message is first converted into a sequence of electric code signals through the action of appropriate apparatus, for example, that commonly known by the registered trade name "Teletype" apparatus. This apparatus may be provided with a keyboard having the conventional number, thirty-two, of different typewriter keys. In contrast to the commerical apparatus, these keys are provided with phonetic character labels instead of the customary alphabetic letters. The message may be what the sender wishes to "speak" at the moment; or it may be matter which he reads, either from a printed page or from perforated "Teletype" paper, and which he recopies. The typing of the message generates ordinary "Teletype" signals in the ordinary way, each distinct signal being uniquely assigned to a single phonetic character. These signals are now transmitted to a receiver station, e. g., over an ordinary telegraph line. At the receiver station there is provided a supply of all the elementary sounds used in the language spoken. Earlier, in the course of the construction of the apparatus these sounds were spoken by a good talker in normal context. They were then recorded on magnetic tape or otherwise to furnish a record of each sound in all combinations, as modified or influenced by any preceding sound and any succeeding sound in normal speech, including the blank, or up to four kinds of influence for each of the adjacent sounds, or sixteeen combinations altogether. Of these sixteen varieties, as many as are significantly different are cut out and stored, the maximum being nine for any one sound and the minimum being one. The incoming "Teletype" signals then choose not only the right sound but also the proper influence effects for the adjacent sounds. Such sounds, in chosen context, are then reproduced as standarized speech. The present invention differs from previous proposals having the same objectives in a variety of ways, but particularly in that it takes account, in the synthesis of each sound, of the effect of adjacent sounds, and further in recovering the information required for the purpose from the normal "Teletype" signal by a process of examination of the adjacent sounds, and in the provision of controlling mechanisms to select accordingly.

The coding of the original message may, if desired, be other than by way of a teletypewriter. For example, a sequence of electric code signals may be generated for transmission by a sound recognizer which responds to the words of a human speaker. Apparatus of this character is disclosed, for example, in Davis-Potter Patent 2,557,909; in an application of K. H. Davis and A. C. Norwine, Serial No. 214,368, filed March 7, 1951, now Patent 2,646,465, issued July 21, 1953; and in an application of R. Biddulph and K. H. Davis, Serial No. 285,454, filed May 1, 1952, now Patent 2,685,615, issued August 3, 1954. As another example, the electric code signals may be derived from the scanning of a printed page in the fashion described by V. K. Zworykin, L. E. Flory and W. S. Pike in Electronics for June 1949, pages 80–86.

The objects and advantages of this invention will be fully understood from the following detailed description of an illustrative embodiment thereof, taken in connection with the appended drawings, of which:

THE INFLUENCE OF A SOUND ON ITS NEIGHBORS

Before launching into a description of the apparatus, it is desirable to point out certain of the more recently discovered features and characteristics of speech sounds on which it is based. It has been discovered that a very substantial fraction of the quality and significance of a speech sound is determined by the frequency of its second formant or "hub" and that from the standpoint of hub frequency the sounds of English speech may with sufficient accuracy for the purpose be classified in one or another of three groups, namely, Group 1, in which the hub frequency is low; Group 3, in which the hub frequency is high; and Group 2, in which the hub has an intermediate frequency. This holds not only for a sound which is being synthesized or reproduced but also for the sounds adjacent to it. It has also been discovered from a spectrographic study of human speech that sounds are spoken differently according to what sound is spoken before and what sound is spoken after. In other words, each sound of continuous speech influences its neighbors. This influence appears chiefly as a shift of the hub. A detailed description of this with many pictorial illustrations is given in pages 38–51 of "Visible Speech" by R. K. Potter, G. A. Kopp and H. C. Green (Van Nostrand, 1947). On the other hand, if speech sounds are recorded as on magnetic tape and if individual units or "phonemes" of such sounds are thereafter cut from the tape and juxtaposed, an abrupt displacement or shift of the hub frequency often occurs between any one sound and the sound which precedes or follows it. This is because with such a juxtaposition of individual record segments, the influences mentioned above are lost. Recent laboratory experiments indicate that while many fine gradations are required in principle to account for or duplicate the influence of each sound on every other, as a practical matter and disregarding initial and terminal sounds, three types of influence at each end of a sound, or a total of nine for any sound, suffice; and, indeed, for many sounds fewer than nine are needed.

Figure 1A:
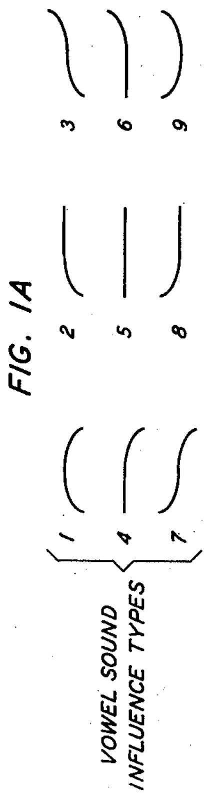
Fig. 1A shows the progress in time of vowel sound triads of nine different types.

Fig. 1A depicts the progress in time of the hub of a vowel sound, starting with the tail end of its predecessor and continuing through to the start of the following sound, for each of these nine possible types of influence. In this figure, the hub frequency or group of the sound under consideration is taken as the norm with the controlling elements being the direction, positive, zero, or negative, independent of the amount of the change in hub position for adjacent sounds. These nine types in turn break down into a group of three times three, as shown in the figure wherein, in sounds of types 1, 2 and 3 the hub rises from the preceding sound to the sound under consideration, in types 4, 5 and 6 it remains the same, and in types 7, 8 and 9 it falls. Among the first three types the hub may fall toward the following sound as in type 1, may remain the same as in type 2, or may rise as in type 3. Types 4, 5 and 6 are similarly distinguished from each other, as are likewise types 7, 8 and 9.

As a matter of actual practice, these nine sound types are required only in the case of the four vowels æ, α, ɔ, and ʌ, which have an intermediate hub frequency. For the other seven vowels with high or low frequency hubs, five of the nine combinations become impossible, leaving only four influence combinations for each. The treatment of the consonants may be still further simplified so that only three influence combinations are required for the thirteen more difficult consonants, namely, p, b, d, k, g, h, f, v, θ, ð, m, n, and η, while a single pronounciation suffices in the cases of seven of the consonants namely, t, s, z, ʃ (as in shy), ʒ (as in azure), r, and l.

SOUND-SELECTING TAPE AND INFLUENCE-SELECTING TAPE

The teletypewriter tape printer offers a convenient instrument for passing from fingering motions to binary-coded perforations on a paper tape. With the five-unit code commonly employed, the fingers select from $2^5$ or 32 keys, 26 of which are for the letters of the alphabet, one is for the blank or space which is effectively the 27th letter of the alphabet, and the other 5 are for operations not needed here, such as period, comma, upper case or figures, and lower case or letters in the Western Electric Co. #14-type tape printer with one key of the 32 not used normally.

There exists also a six-unit "Teletype" system giving $2^6$ or 64 combinations to select from. This system is known as the No. 20 type and finds use in typesetting for newspapers and magazines.

Each of these "Teletype" systems, in addition to its 5 or 6 units of time for combination selecting, includes a special unit of time for starting each letter and a special one for stopping. The stock ticker treats starting and stopping by a regular time unit assigned to each, thus giving an eight-unit code which provides starting, stopping, and a choice of 64 different combinations. This ticker uses one unit of its code for selecting between numbers and figures, whereas the "Teletype" employs a 5- or 6-key combination, thus making the teletypewriter nonprinting for the combination in which shifting occurs. It is plain, therefore, that selecting machinery has been developed applicable to choosing from among a much greater number of sounds, than is contemplated in the phonetic alphabet of the present system.

Figures 1B, 1C:
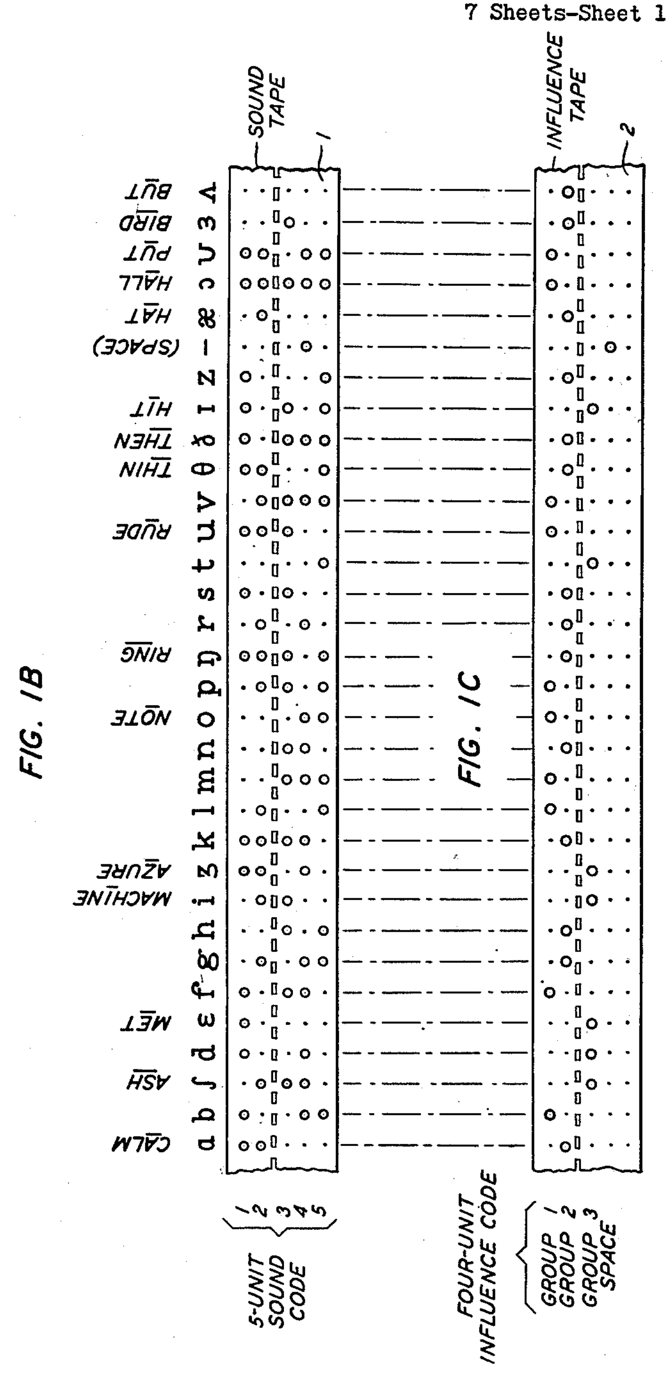
Fig. 1B shows the phonetic alphabet employed and the perforation code therefor.
Fig. 1C shows the code for the influence of adjacent sounds on which this system is based.

Fig. 1B shows a sample tape 1 bearing the 32 punch code combinations with their assignments modified somewhat arbitrarily for various speech sounds. The first 26 combinations shown are those which in the common "Teletype" code stand for the letters a to z, respectively. See, for example, Electrical Engineering Handbook, part V, Electrical Communication and Electronics, section on Printing Telegraph Systems, Pender and McIlwain. In the code as modified for the present purposes, the 26 letters of the alphabet are replaced by 26 phonetic symbols, 15 of which, all consonant sound symbols, remain as in the printed form, namely, b, d, f, g (as in got), h, k, l, m, n, p, r, s, t, v and z. The five vowels, a, e, i, o and u of the normal keyboard have arbitrarily been given the pronunciation associated with them in the speech and literature of Continental Europe, the sounds being α, ε, i, o, u, namely, those underscored in the following words, respectively: father, met, machine, note, rude. As for the other six letters of the printed alphabet, c, j, q, w, x and y, there is in English speech no unique association of an individual sound with any of these letter symbols, so for these six, the following respective substitutions have been made as indicated by phonetic symbols and underscoring in an illustrative word.

For c substitute ʃ as in she

For j substitute ʒ as in azure

For q substitute ŋ as in sing

For w substitute θ as in thin

For x substitute ð as in then

For y substitute ɪ as in it

The remaining six of the available 32 combinations provide for the space and five more vowels taken here as æ as in at
ɔ as in all
ʊ as in put
ɜ as in bird
ʌ as in but These 32 sounds including the zero sound or space give a rough minimum set of phonetic elements needed for English speech. Needless to say, by going to a code of more units, finer shading of sound can be provided for. Thus a six-unit code allows for 64 distinct sounds, etc.

The choice of sound characters for inclusion in the list or "vocabulary" is somewhat arbitrary and therefore flexible. For example, no character is included for the initial consonant of "chew." This is readily simulated by the sequence tʃ. Similarly a diphthong is well simulated by a sequence of vowels. This and other such economies result in restricting the number of different characters to 31. These, together with a last one for the blank, are readily fitted to standard 32-character teletypewriter systems.

With the foregoing changes from the printed alphabet of the conventional "Teletype" system to the phonetic characters needed for the present system, the teletypewriter apparatus can operate to print such phonetic characters or to perforate their code counterparts on tape, and, by energizing appropriate sources, to "talk" in a standardized voice.

To improve the naturalness and increase the intelligibility of synthesized speech, it is desirable to take account of the influence which, as discussed above, each speech sound exerts on its neighbors. To do this, the group in which each sound falls is coded, as well as the identity of the sound. Fig. 1C illustrates a convenient approach to the group coding. It shows auxiliary perforated tape 2 having five perforation rows in four of which a perforation may appear. As indicated at the left of the tape, the first row is assigned to sounds of Group 1, the second to those of Group 2 and the third to Group 3. The fourth is assigned to blanks or silent intervals. Inasmuch as only three groups and a blank need be provided for, the simplest code, though not the most economical, is the one-out-of-four code shown. The choice from three groups and a blank can, if desired, be made from two rows of perforations which yield four combinations, though, for the sake of its simplicity, the one-out-of-four code shown is preferred.

The row in which a perforation appears then constitutes a code designation of the group in which falls the phonetic character to which the perforation applies. As above stated, the group of a sound indicates the frequency range of its second formant. It will be noted that the indicated formant ranges are in accord with the abbreviated diagrams for speech sounds which are reproduced in the figure on page 60 of the book "Visible Speech" referred to above.

Now, since the group numbers of the adjacent sounds uniquely determine the influences on any particular sound, the coded information punched in the first three perforation rows of the tape 2 of Fig. 1C is adequate to control the correct selection of each doubly influenced sound. When either or both of the adjacent sounds is missing the sound under consideration may be termed "singly influenced" or "uninfluenced," and the fourth perforation row is provided for such situations.

One simple method of handling the provision of influence-indicating perforations is to transmit the speech code to its receiving point by "Teletype" signals in the normal way and there utilize the incoming "Teletype" signals to perforate two tapes: a first or sound-selecting tape 1 as shown in Fig. 1B and a second or influence-selecting tape 2 as shown in Fig. 1C. Then the two tapes, sound-selecting and influence-selecting, can be synchronized with corresponding sprocket holes matched so that they stay in synchronism as the speech is synthesized.

THE SYSTEM

Figure 2A:
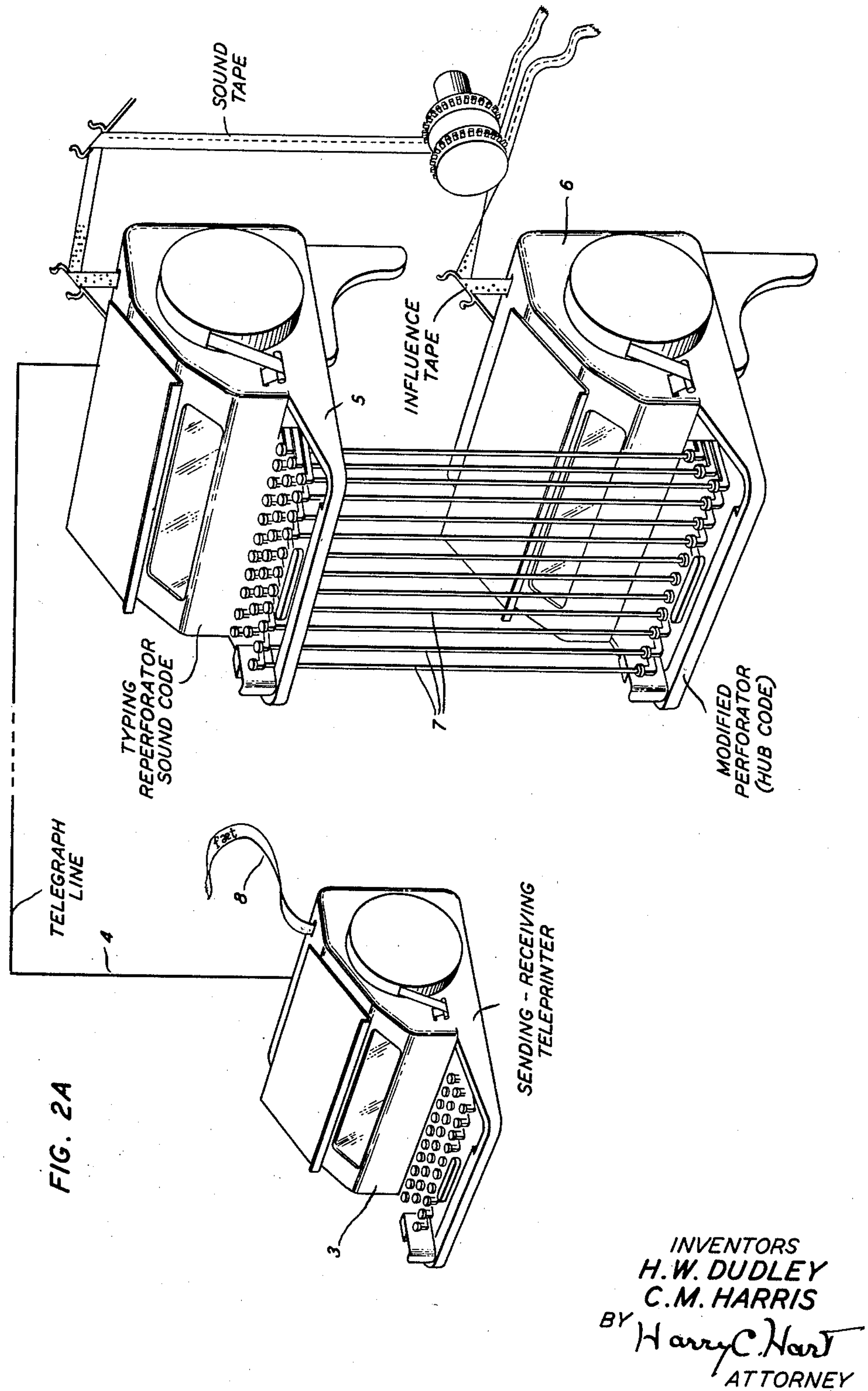
Figs. 2A and 2B show diagrammatically an embodiment of the invention in a working system.
Figures 2B, 3A, 3B, 3C, 3D, 8:
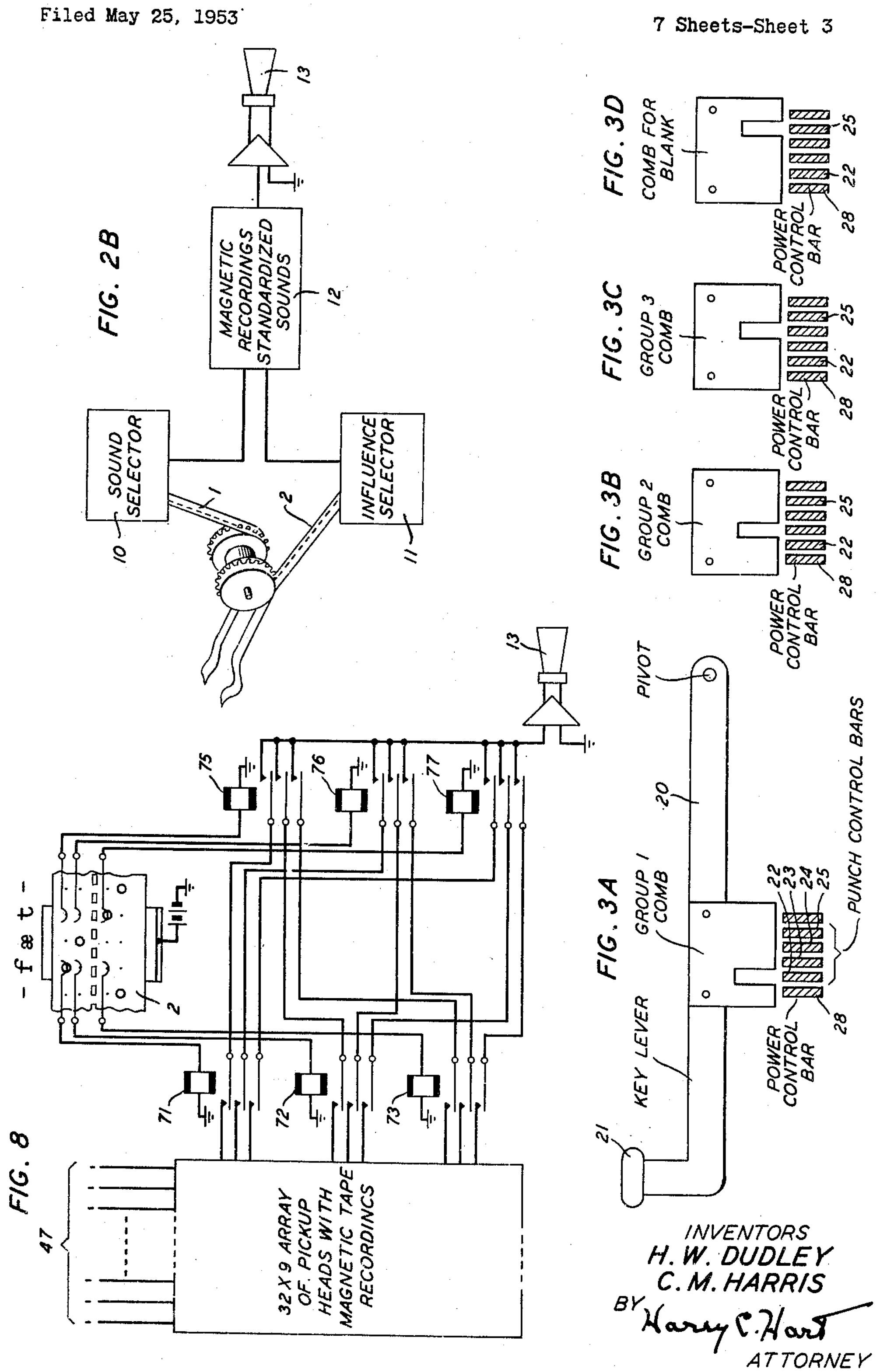
Figs. 3A–3D show various parts of a "Teletype" perforator as modified to produce the influence effect as a coded series of perforations on a paper tape.
Fig. 8 shows a simplified influence selecting switching circuit.
Figure 9:
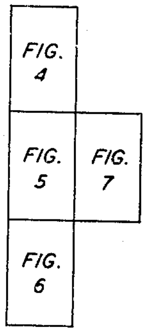
Fig. 9 shows the relative locations of Figs. 4, 5, 6 and 7.

In Fig. 2A is shown, in block form, apparatus for transmitting "Teletype" signals from a sending station to a receiving station and, at the receiving station, apparatus for receiving these incoming "Teletype" signals and producing from them two tapes, namely, a sound-selecting tape 1 as shown in Fig. 1B and an influence-selecting tape as shown in Fig. 1C. Fig. 2B, the discussion of which will be postponed, shows, in block form, apparatus for synthesizing artificial speech sounds under control of these two tapes. At the left of Fig. 2A is a teletypewriter sending instrument 3 which may be of the standard form such as the W. E. Co. #14-type printer modified only in that the letter markings on some of the keys are changed to correspond to the phonetic characters as shown in Fig. 1B. The message to be sent is typed on the keyboard of this instrument. This typing operation can take place at any convenient speed and even with interruptions, as the reproduction speed is independently set by the construction of the apparatus. However, at present the top speed is limited by the "Teletype" apparatus and by the operator's skill, to a maximum of 125 words per minute, a rate corresponding to, or perhaps slightly slower than, an average talker's speed. In principle, the apparatus can be designed for higher speeds.

At the sending end of the teletypewriter apparatus prints a copy of the message as sent on a tape 8, which may be preserved as a record.

The "Teletype" message is transmitted, as a sequence of the "Teletype" code signals, over a telegraph line 4 by the usual method to the receiving end. This message can be handled like any other "Teletype" message. Thus it can be stored in the form of perforated tape at an intermediate point and this tape later used to send the message on.

At the receiving end of the system a conventional "Teletype" perforator 5 such as the W. E. Co. #14-type tape reperforator is provided. This apparatus responds to incoming "Teletype" code signals and produces a tape 1 bearing punched holes arranged in rows in accordance with this code, as shown in Fig. 1B, one hole or group of holes for each of the phonetic characters of the alphabet employed. At the same time, in response to the same incoming signals, it prints the incoming message in phonetic characters along the margin of the tape. Moreover, it is provided with a set of typewriter keys, labeled with the phonetic characters of the vocabulary, for use in the transmission of "Teletype" signals. When it is receiving and perforating the sound-selecting tape 1, these keys move up and down as though operated by an invisible typist.

A second perforator 6, modified to perforate a second or influence-selecting tape 2 in accordance with the influence code as shown in Fig. 1C, is also provided. Its internal construction may be as described below. It is preferably coupled either electrically or mechanically with the incoming code signals. A simple way in which this coupling may be provided is to mount this second perforator 6 above or below the first one 5 so that similarly labeled keys of the two perforators are in alignment. Light, stiff rods 7 may then interconnect the two similarly labeled keys of each such pair. Thus, the incoming code signal representing any particular phonetic character operates electromagnetically to make the arrangement of perforations in the sound-selecting tape 1 which corresponds to this signal and to depress the correspondingly labeled key. The depression of this key acts through the coupling rod 7 to depress the similarly labeled key of the second perforator 6 which then operates to make a perforation in one or another of the rows of the influence-selecting tape 2, the selection being in accordance with the code shown in Fig. 1B.

If preferred, the perforator 6 may be operated independently, the coupling to the incoming signals being by way of the eyes and hands of a human operator. This operator may read the printed message as it appears, character by character, on the sound tape 1 and may copy off the message on the keys of the influence perforator 6 which then constructs the influence tape 2 as described above.

The influence perforator 6 may well be a W. E. Co. #14-type tape perforator with the code bar modified as explained below in connection with Fig. 3.

These two perforated tapes 1, 2, hereinafter denoted for short the "S-tape" and the "I-tape," may be employed immediately for speech synthesis or they may be reeled up and stored for later use.

A two-way circuit can of course be provided by using a similar circuit poled oppositely for transmission in the reverse direction, or the usual telephone methods can be used to combine the transmitting and receiving apparatus at each terminal for transmission over a single two-wire line.

The apparatus for reproducing the selected samples of recorded standardized sounds to make the synthesized speech under control of these two tapes acting as sound and influence selectors is shown in block diagram form in Fig. 2B. The tapes must be synchronized. They are fed, respectively, to a sound selector 10 and to an influence selector 11. These two apparatus elements operate conjointly to control the selection, from among a number of phonograph records of sounds contained in the set 12, not only of the correct sound but of the correct influence as well. The phonograph record ultimately selected furnishes its output to a reproducer 13 which then speaks in a standardized voice.

THE INFLUENCE TAPE PERFORATOR

Figs. 3A, 3B, 3C and 3D show the lever and control bar arrangements for punching the tape 2 with the influence code perforations which indicate that a sound belongs to Group 1, Group 2, Group 3, or is a blank. Considering Fig. 3A, for example, the structure may be identical with that employed in the standard W. E. Co. #14-type tape perforator for the manually operated key which is there labeled with the letter e. As here employed, however, it may be labeled or otherwise identified with the phonetic symbol b or, indeed, with any one of the seven other phonetic symbols which, as shown in Fig. 1C, are members of Group 1. It comprises a lever 20 to which is fixed the appropriately labeled key 21 and which bears a comb **27*a* which is cut from a standard flat piece of metal in a fashion to depress all the unwanted ones of a group of control bars 22, 23, 24, 25 and thus prevent punch bar operation by them. As shown in the figure, when the key 21 is depressed, punch control bars 23, 24 and 25 are likewise depressed to prevent punching action by the punches which they control, leaving the bar 22 undepressed. By virtue of the construction of the standard apparatus, the simultaneous additional depression of the power control bar 28 shown at the left of the punch control bars by the left-hand margin of the comb 27*a*, operates to punch one hole on the influence tape 2** in the first row, thus indicating that the phonetic symbol in question is a member of Group 1.

A sixth bar, which forms a part of the commercial unit, is shown in the figure but is not employed in the present system.

Figs. 3B, 3C and 3D show combs **27*b*, 27*c*, and 27*d*, respectively, which operate the bars 22–25 and 28 in the same fashion to punch the influence tape 2** with holes whose locations represent sounds of Group 2, Group 3 and blank, respectively.

The configurations of the combs **27*a*, 27*b*, 27*c* and 27*d*** correspond, in the commercial W. E. Co. #14-type tape perforator, to the letter e, line feed, space, and carriage return, respectively. In effect then, a standard perforator with only four types of bars is employed but each bar is operated by all of the sounds whose second formant or "hub" position falls in the group to which this bar is assigned, with one bar for blank.

Two important considerations which must be taken into account in the reproduction of the synthesized speech under control of the S-tape 1 and the I-tape 2 are:

1. The influence exerted on each sound by the next later sound cannot be identified until the next later sound is received so that there is an inherent delay of one sound element.
2. For proper choice of influenced sound, three sounds must be observed simultaneously, so that some sort of storage is necessary.

The perforated paper offers a simple and convenient storage-type delay and it is much simpler to use four perforations to give a new tape than to derive the information from the thirty-two combinations perforated on the S-tape 1 for the preceding sound and the thirty-two for the following sound, a total number of 1024 combinations to choose from. With these general considerations in mind it is believed that the arrangement shown is the simplest arrangement to provide for influences when, as here, the desirability of using present "Teletype" sound-selecting apparatus to the maximum possible extent is assumed.

THE SOUND SELECTOR

Figure 4:
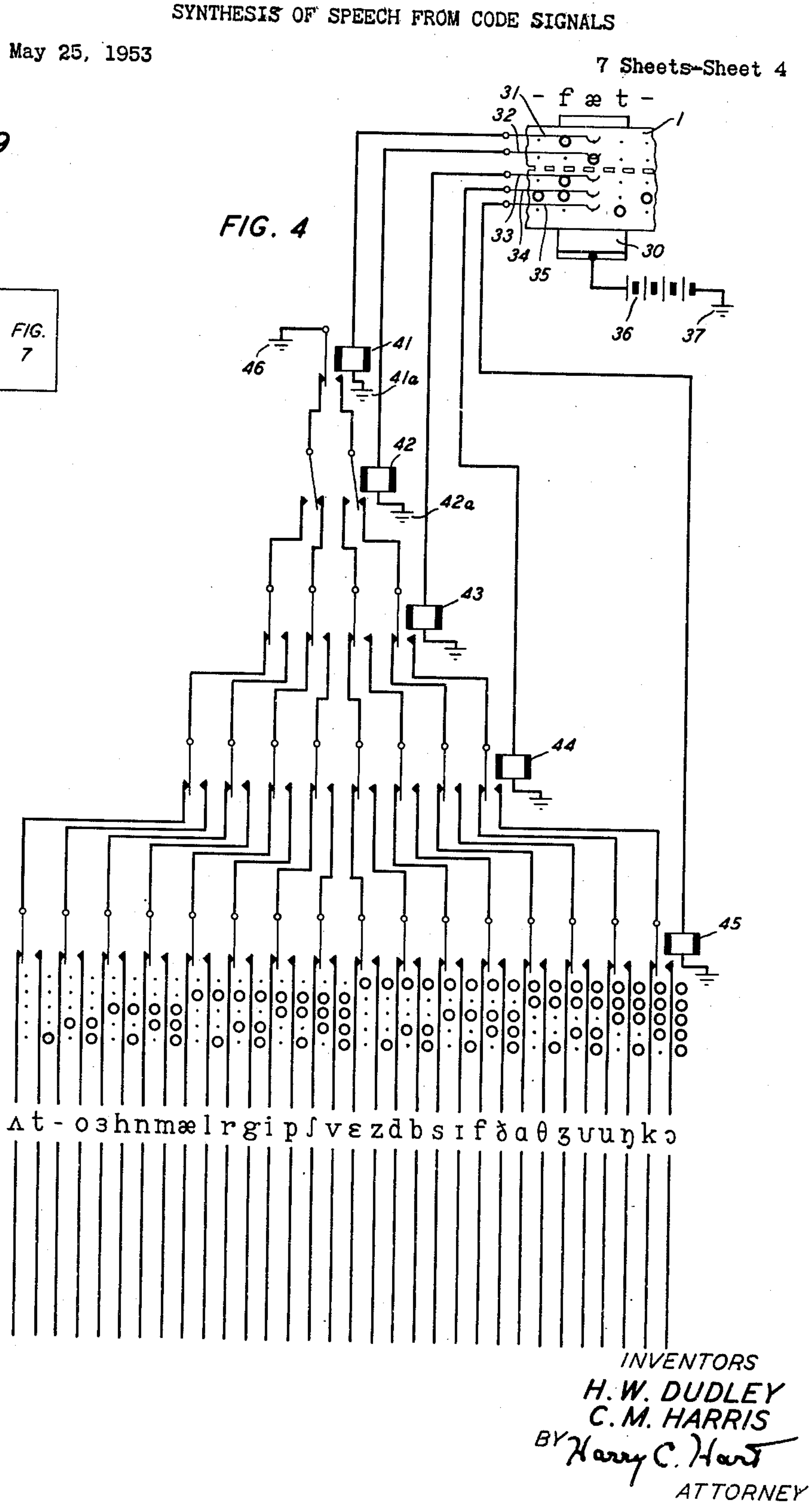
Fig. 4 shows a relay circuit for making a preliminary selection of a desired sound.

Fig. 4 shows a switching circuit for selection of sounds. At the top right is illustrated a section of the S-tape 1 with the perforations arranged in rows as in Fig. 1B, corresponding to the word fat (phonetic fæt) preceded and followed by spaces ( – ) as the tape travels from right to left. Between the second and third perforation rows are the sprocket holes for driving the tape. The tape moves over a conducting platen 30 which is connected by way of a battery 36 to ground 37. Five metal fingers 31–35 press on the tape and make contact with the platen 30 through the perforations when they pass under the tips of the fingers. Instead of conduction through perforations, displacement contacts may be used. The five fingers 31–35 are connected to corresponding relays 41–45 which, in their thirty-two combinations of operate and nonoperate, establish a connection from ground 46 to one and only one of the thirty-two leads 47 at the foot of the figure, each of which is labeled with the perforation code designation of the sound which it controls. For convenience of circuitry, the thirty-two characters have been arranged in a different order from the alphabetical order employed in Fig. 1A.

At the instant under consideration, the five fingers 31–35 are sensing the punched holes in the S-tape 1 whose arrangement constitutes the code representation of the character æ, namely, the vowel sound in the word "fat." Referring again to Fig. 1B, the code representation of this character consists of a single perforation in the second row, the other rows being unperforated. Thus, the second finger 32 makes contact through the perforation with the platen 30 and establishes an electrical connection through relay 42 and the battery 36 to ground at **42*a*. Relays 41, 43, 44 and 45 remain unoperated. A connection may now easily be traced from ground 46 connected to the armature of the relay 41 in its left-hand position to the right-hand contact of relay 42 and through the left-hand contacts of relays 43, 44 and 45. Thus ground potential is applied to the lead for the character ae while all other conductors of the group 47** remain insulated from ground. It may be noted in passing that this conductor is also identified by the symbol ". 0 . . ." which is the code representation for the arrangement of punched holes corresponding to that character in the perforation code of Fig. 1B.

It will be observed that every possible arrangement of punched holes in the S-tape 1 gives rise to a ground connection on one, and only one, of the conductors 47, and that that one in each case represents the character of Fig. 1B to which that code combination has been assigned.

Each of the conductors 47 at the foot of Fig. 4 enters the apparatus of Figs. 5, 6 and 7 as shown at the upper margin of Fig. 5 where it controls a part of the sound-selection operation as shown below.

THE INFLUENCE SELECTOR

Figure 5:
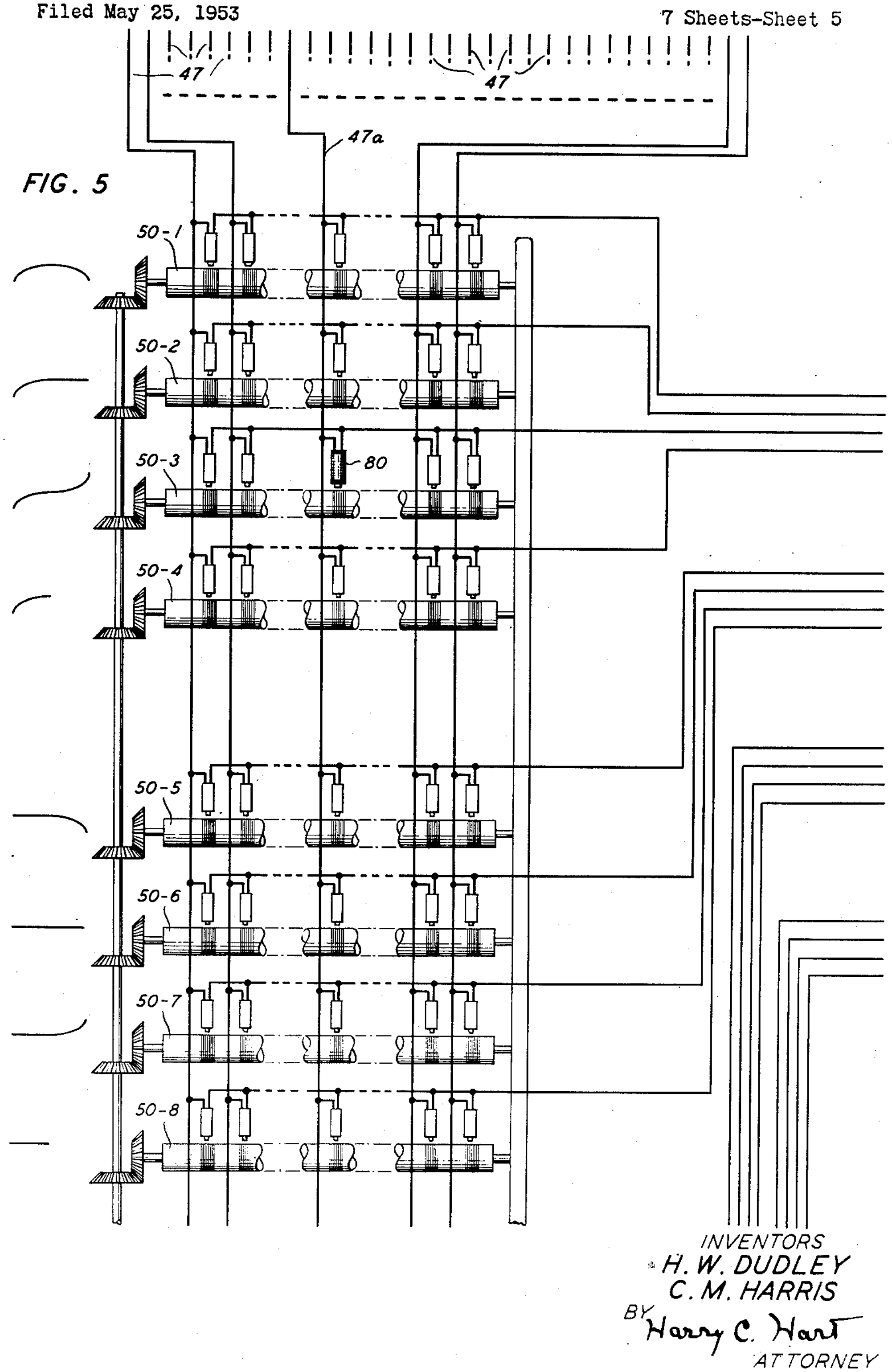
Figs. 5, 6 and 7 show a switching circuit for making the final selection of the desired sound in terms of the various influences exerted upon it.
Figure 6:
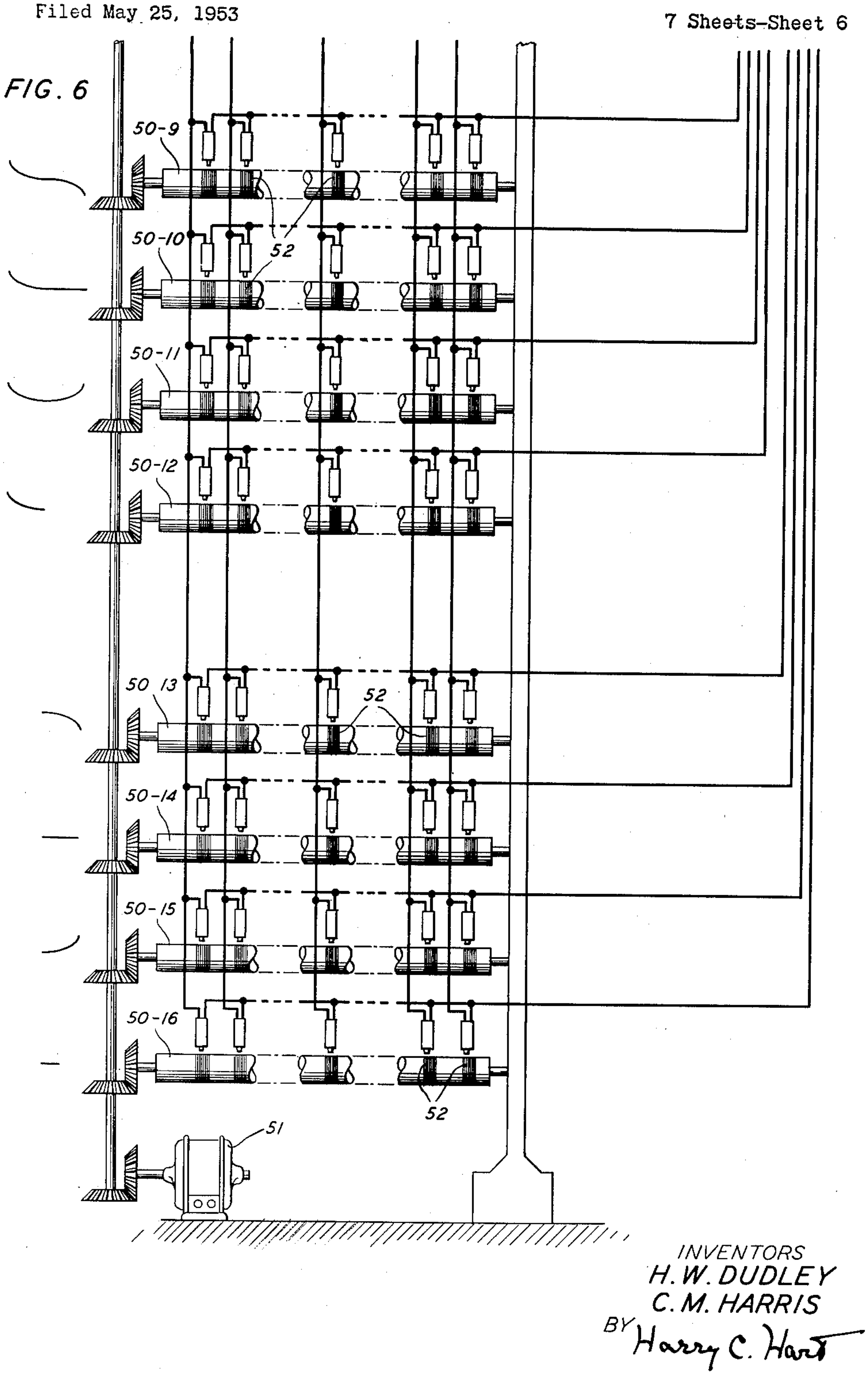
Figure 7:
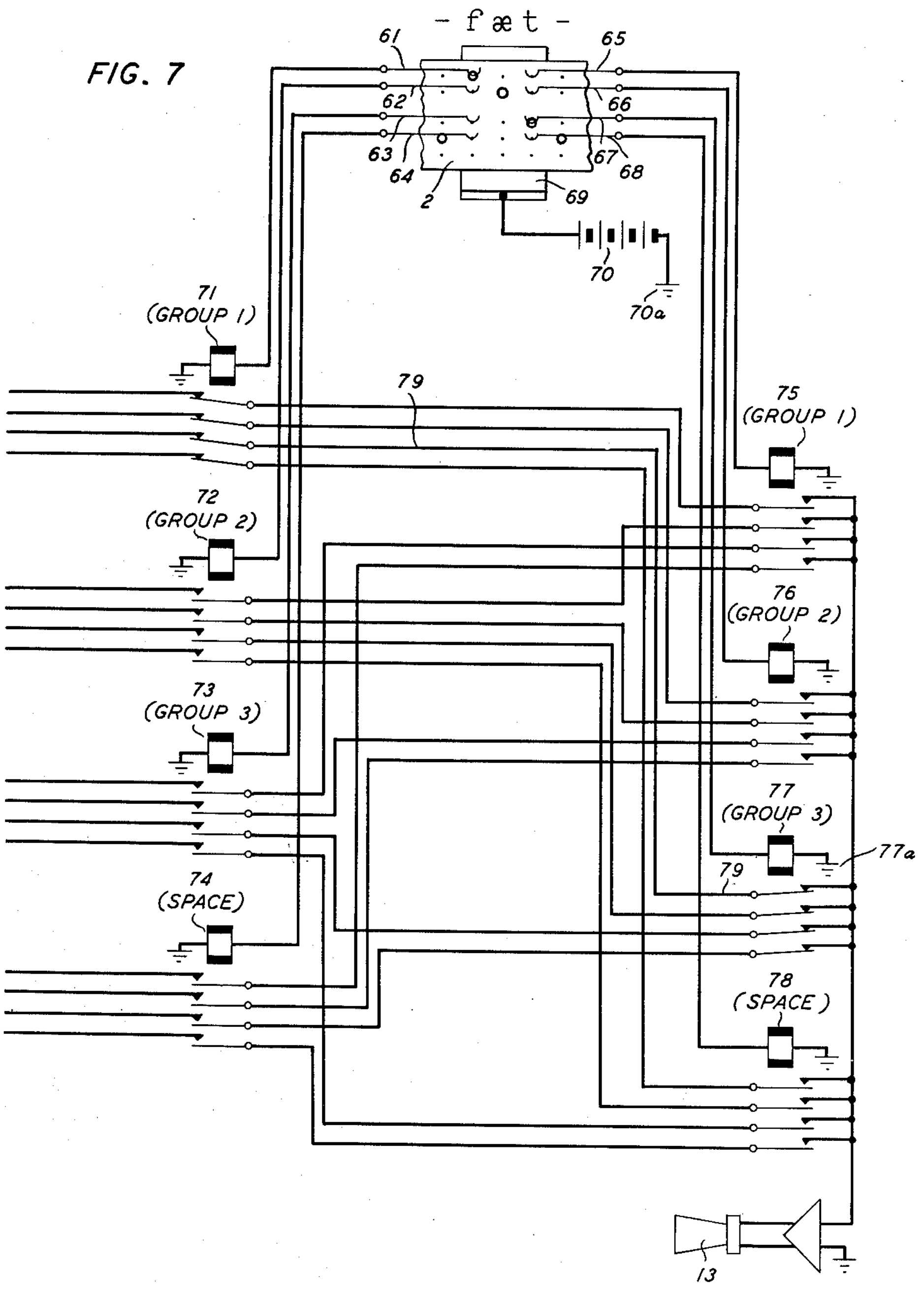

The circuit of Figs. 5, 6 and 7 then receives from the circuit of Fig. 4 information as to the coded sound on the S-tape 1 at the instant of interest, this information being passed on as a ground on the appropriate one of the conductors 47 to signify the particular sound, an absence of ground on any lead meaning likewise an absence of that sound at the moment.

Here and elsewhere throughout the switching circuits used, a single set of contacts is operated to produce a circuit condition. Assuming ordinary Western Electric Company U-type relays, such contacts can be operated and circuits completed through them in a time of the order of a millisecond. This time is so short as scarcely to produce any observable switching noise. In general, relays and operating speeds throughout are to be selected and aligned so that as one sound is terminated the next comes on without any intervening interruption.

In Figs. 5 and 6 at the left are shown an array of sixteen drums 50–1, 50–2 . . . 50–15, 50–16 driven by a common driving motor 51. Each of these drums 50 bears a group of thirty-one sound track records in the form, for example, of magnetized tapes 52 wrapped around the drum at different distances from the end of the drum. On any one drum, each of these records is of one of the sounds of the phonetic alphabet of Fig. 1. There are thus sixteen different records of each of these thirty-one different sounds. Nine of them may differ among each other as to type; i. e., for vowels, in the fashion depicted in Fig. 1. Of the remaining seven, three are for cases in which the preceding sound is a blank; i. e., the sound in question is an initial sound. Three others are for the cases in which the following sound is a blank, and one is for cases in which the sound in question is both preceded and followed by a blank. Thus, for example, the records of a particular vowel sound on drums 50-1, 50-2 and 50-3 are all characterized by a preceding sound having a lower hub. Within this subgroup the record on the first drum 50-1 is characterized by a following sound which also has a lower hub, that on the second drum 50-2 by a following sound whose hub is of the same frequency, and that on the drum 50-3 by a following sound having a hub of higher frequency. These differences are indicated by marks showing the progressive bar shift which characterizes the vowel sound records on any single drum, of which nine are in the same form as those of Fig. 1 while the remaining seven are modifications thereof, called for by a preceding blank, a following blank, or both.

At the upper right part of Fig. 7 a short portion of the I-tape 2 is shown which bears the hub group code representation of the same word "fat" whose S-tape 1 is shown in Fig. 4. In Fig. 4, the sound being selected is "æ." In Fig. 7, however, the selection is of the sounds which precede and follow this vowel, namely, in this case "f" and "t." Two groups of four sensing fingers 61-64, 65-68 are indicated as bearing on the influence tape 2 in position to make contact through its perforations, when they appear, with a platen 69 which is connected by way of a battery 70 to ground 70*a*. The fingers of the left-hand group 61-64 sense the perforations which designate the preceding sound and those of the right-hand group 65-68 sense the perforations which designate the following sound. The first finger 61 of the left-hand group, when thus energized, operates the upper left-hand relay 71, and so pulls up four armatures selecting the four drums 50-1, 50-2, 50-3, 50-4 in the upper subgroup. Similarly, the second finger 62, if so energized, would select the drums of the second subgroup, while the fourth finger would select the drums of the fourth subgroup. These selections, however, are only partial because the left-hand relay contacts of the first four drums are connected in series with the upper contacts of the four right-hand relays designated Group 1, Group 2, Group 3, and Space, respectively. Similarly the contacts of the relay 72 which selects the second group of drums 50-5 to 50-8 on the left are connected in series with the No. 2 contacts of all four right-hand relays. The same connections and distribution hold with respect to the third and fourth relays 73, 74, the third and fourth groups of drums, and the No. 3 and No. 4 contacts of all the right-hand relays.

Simultaneously, the third finger 67 of the right-hand group of sensing fingers makes contact through a Group 3 perforation of the tape 2 with the platen 69. This establishes a circuit from ground at 70*a* through the battery 70, the platen 69, the sensing finger 67 and the right-hand Group 3 relay 77 to ground at 77*a*. This energizes the relay 77 to pull up all of its armatures which are connected, respectively, to the No. 3 contacts of all of the left-hand relays 71, 72, 73, 74. In particular the No. 1 contact of the relay 77 is connected to the No. 3 contact of the relay 71 so that energization of the two relays 71 and 77 and no others operates to select the third drum 50-3 of the first subgroup of drums and no others; i. e., that drum whose record of the sound æ is of Type 3, namely, one which is preceded by a sound whose hub is of lower frequency and followed by a sound whose hub is of higher frequency.

In general, and in the same fashion, the final selection of one, and only one, drum of the sixteen is made in dependence, first, on whether the preceding sound is of Group 1, 2 or 3, or a blank, and, second, in terms of whether the following sound is of Group 1, 2, 3, or a blank.

The selection of particular drum thus being made in terms of the hub character of the preceding and following sounds, the circuit is completed from that one of the conductors 47 of Fig. 4 which was grounded in the fashion described in connection with Fig. 4 through the pickup head 80 (phonographic needle, magnetic reproducer, or otherwise) through a contact of one and only one of the four left-hand relays 71, 72, 73, 74 and finally through a single one of the contacts of only one of the right-hand relays 75, 76, 77, 78 to the loud speaker 13 which then radiates into the air, in response only to the received "Teletype" code signal, a sound which is a close simulation of the desired sound, namely, that for which one particular key of the transmitter teletypewriter was originally depressed and as influenced, moreover, by the character of the sound which precedes it and of that sound which follows it.

REDUCTION OF COMPLEXITY

In Fig. 5, each of the sixteen drums bears, ideally, a total of thirty-two sound tracks or a total of 512 for the sixteen drums, and each of them is provided with its own pickup head. This number is actually reduced to 496, i. e., in the ratio of 31 to 32, by virtue of the fact that one of the sound tracks on each drum is the record of the silent blank. Even so, this is a wasteful arrangement, because many of these sound tracks contain identical or equivalent information as to influence factors. The reason for this is as follows:

The nine influence types, which apply in principle to any sound, apply in fact only to four of the vowel sounds, namely, æ, ɑ, ɛ and ʌ. The other seven vowels are well simulated with a choice of one from a group of only four combinations each. The treatment of the consonants may be still further simplified, so that only three influence combinations are required for the thirteen more difficult consonants, namely, p, b, d, k, g, h, f, v, θ, ð, m, n, ŋ, while a single pronunciation suffices in the cases of seven of the consonants, namely, t, s, z, ʃ (as in shy), ʒ (as in azure), r and l.

These circumstances make it possible to classify the sounds of speech and to formulate rules for selecting the influence factors which hold between any sound and its neighbors, as follows:

CLASSIFICATION OF SPEECH SOUNDS

*Consonants*

For convenience in discussing the transmission of standardized speech, the consonant sounds may be classified in the following way:

1. According to hub position (the visible or hidden position of bar 2 of its sound spectrogram when the sound is uttered alone). The frequency range that such hubs occupy has been divided arbitrarily into three groups, numbers 1, 2, and 3, in the order of increasing frequency.

2. According to type. Whereas the hub position depends on the bar position of the consonant when it is uttered *alone*, the type depends on the influence that adjacent sounds have on the consonant. Thus when adjacent sounds have relatively little influence on a consonant, e. g., s, there is only type for this consonant. However, when adjacent sounds influence the consonant, there is more than one type. The wide variety of possibilities may be classified into three types: α, β, and γ.

3. According to the position of the consonant sound in the word, i. e., initial, medial, or final.

*Vowels*

The vowel sounds may be classified in the following way:

1. According to hub position (the position of bar 2 of its sound spectrogram when the vowel sound is sustained). The frequency range that these hubs occupy has been divided arbitrarily into three groups, Nos. 1, 2, and 3, for increasing frequency as with the consonants.

2. According to type. Whereas the hub position depends on the bar position of the vowel sound when it is sustained, i. e., pronounced by itself, the type depends in addition on the influence that adjacent sounds have on the vowel. The wide variety of possibilities may be classified into the nine types of Fig. 1A.

3. According to the position of the vowel sound in the word, i. e., initial, medial, or final.

SELECTION RULES FOR CONSONANTS

There is but one choice for seven of the consonant sounds. Where three types exist, the following selection rules apply:

1. If the consonant is an initial one, select a type which has the same number as the group number of the hub of the following sound (α—Group 1, β—Group 2, γ—Group 3).

2. If the consonant is a final one, select a type which has the same number as the group number of the hub of the preceding sound.

3. If the consonant is both initial and final, as "sh" for example, select as type the group number of that consonant.

4. If the consonant is a medial one, (*a*) If the hub position of the preceding and following sounds are the same, select a type which has the same number as the group number of these hub positions;

(*b*) If the hub positions of the preceding and following sounds are such that one is of Group 1 while the other is of Group 3, select a consonant of Type β;

(*c*) If either the preceding or the following sound has a hub of Group No. 2 while the other has a hub of Group No. 1 or Group No. 3, select a type having the same number as the group number of the following sound.

SELECTION RULES FOR VOWELS

A vowel sound of a particular type is selected on the basis of the hub positions of both the preceding and the following sounds. In order that the initial influence be correct, the hub position of the vowel sound is compared with that of the preceding sound; if the preceding sound has a hub position which has a group number which is 1. *The same*, type 4, 5, or 6 should be selected;
2. *Higher*, type 1, 2, or 3 should be selected;
3. *Lower*, type 7, 8, or 9 should be selected.

In case the vowel is the initial sound in the word, rule (1) applies. Which of the three types should be selected for any particular case depends on a comparison of the vowel sound with the sound which follows it; if the following sound has a hub position whose group number is 4. *The same*, type 2, 5 or 8 should be selected;
5. *Higher*, type 1, 4, or 7 should be selected;
6. *Lower*, type 3, 6, or 9 should be selected.

In case the vowel sound is the final sound in the word, rule (4) applies. If the vowel sound is both initial and final as in "oh," type 5 with flat formant resonance versus time should be selected. These selections correspond to the forms in Fig. 1A.

By following the foregoing rules it becomes possible to tabulate all the significant influence factor types which hold in English speech for all the sounds, as follows:

SCHEDULE IA.—CONSONANTS

| Drum No. | Group (Hub) of Adjacent Sound | | Blank or space | Consonants Class 1 (l, s, z, r, t, ʃ, ʒ) | Consonants Class 2 (p, b, f, v, m, k, g, h, θ, ð, n, ŋ, d) |
|---|---|---|---|---|---|
| | Preceding | Following | | | |
| 1 | 3 | 3 | – | β | γ |
| 2 | 3 | 2 | – | β | β |
| 3 | 3 | 1 | – | β | β |
| 4 | 3 | – | – | β | γ |
| 5 | 2 | 3 | – | β | γ |
| 6 | 2 | 2 | – | β | β |
| 7 | 2 | 1 | – | β | α |
| 8 | 2 | – | – | β | β |
| 9 | 1 | 3 | – | β | β |
| 10 | 1 | 2 | – | β | β |
| 11 | 1 | 1 | – | β | α |
| 12 | 1 | – | – | β | α |
| 13 | – | 3 | – | β | γ |
| 14 | – | 2 | – | β | β |
| 15 | – | 1 | – | β | α |
| 16 | – | – | – | β | β |

SCHEDULE IB—VOWELS

| Drum No. | Group (Hub) of Adjacent Sound | | Class 1 (ɔ, o, ʊ, u) | Class 2 (i, ɪ, ϵ) | Class 3 (æ, α, ə, ʌ) |
|---|---|---|---|---|---|
| | Preceding | Following | | | |
| 1 | 3 | 3 | 1 | 5 | 1 |
| 2 | 3 | 2 | 1 | 6 | 2 |
| 3 | 3 | 1 | 2 | 6 | 3 |
| 4 | 3 | – | 2 | 5 | 2 |
| 5 | 2 | 3 | 1 | 8 | 4 |
| 6 | 2 | 2 | 1 | 9 | 5 |
| 7 | 2 | 1 | 2 | 9 | 6 |
| 8 | 2 | – | 2 | 8 | 5 |
| 9 | 1 | 3 | 4 | 8 | 7 |
| 10 | 1 | 2 | 4 | 9 | 8 |
| 11 | 1 | 1 | 5 | 9 | 9 |
| 12 | 1 | – | 5 | 8 | 8 |
| 13 | – | 3 | 4 | 5 | 4 |
| 14 | – | 2 | 4 | 6 | 5 |
| 15 | – | 1 | 5 | 6 | 6 |
| 16 | – | – | 5 | 5 | 5 |

In practice, therefore, it is desirable to provide the drums of Figs. 5, 6 and 7 with sound tracks which are selected in accordance with the foregoing rules and whose influence factor types are as listed in the foregoing table.

The first column in the above Schedule IA is for the blank or space. For this condition the magnetic pickup heads 80 may well be omitted although they are shown in the figure to complete the array. In a sense the blank is a degenerate sound, either a vowel or perhaps more precisely a consonant, differing from the other sounds in that it has zero power. However, the effect of the blank in influencing adjacent sounds does not follow the influence rules which hold either for the vowels or for the consonants. These rules assume a fixed hub for the influencing sound, whereas the blank is to have no influence and in that way corresponds in overall effect to an influencing sound of the same hub as the influenced sound. In this respect the blank may be said to have an effective hub in any of the three positions, low, medium or high, and, further, this effective hub for a given blank may be in one position for the preceding sound and in a different position for the following sound. Accordingly, the blank is shown in Schedule IA as having assigned to it a group ( – ) by itself. However, to economize apparatus in the influence selector shown in Fig. 8 it is convenient to treat the blank as though it were a sound of a single type and so it is there classed with the consonants of the first class. In addition to the influence of the blank on other sounds, the influence of other sounds on the blank must be considered. In this case the S-tape 1 selects a silent interval, so that the influence effect degenerates to zero to become a technicality as to relay contact closures for the silent condition rather than a practical matter involving selection from among different sounds.

If the next step is taken and the blank is treated as a fixed single-type consonant of the median group, instead of a variable character, then the 4×4 combinations required for adjacent sounds are reduced to 3×3 with a great saving of apparatus as the influence selector circuit of Figs. 5, 6 and 7 are reduced to that shown in Fig. 8, and the type schedule given above is reduced to the following for the rectangular array of magnetic pickup heads of thirty-two columns (thirty-one excluding the blank) but with only nine rows instead of sixteen:

SCHEDULE II

| Row | Group of Adjacent Sound | | Consonants | | Vowels | | |
|---|---|---|---|---|---|---|---|
| | Preceding | Following | Class 1 | Class 2 | Class 1 | Class 2 | Class 3 |
| 1 | 3 | 3 | β | γ | 1 | 5 | 1 |
| 2 | 3 | 2 | β | β | 1 | 6 | 2 |
| 3 | 3 | 1 | β | β | 2 | 6 | 3 |
| 4 | 2 | 3 | β | γ | 1 | 8 | 4 |
| 5 | 2 | 2 | β | β | 1 | 9 | 5 |
| 6 | 2 | 1 | β | α | 2 | 9 | 6 |
| 7 | 1 | 3 | β | β | 4 | 8 | 7 |
| 8 | 1 | 2 | β | β | 4 | 9 | 8 |
| 9 | 1 | 1 | β | α | 5 | 9 | 9 |

The circuit of Fig. 8 is seen to reduce the number of magnetic pickup heads from 16×31=496 to 9×31=279, a saving of 43%, accompanied by a slight saving in relays and wiring.

One can observe the changes produced in forming the 3×3 Schedule II from the 4×4 Schedules IA and IB by replacing in each line in the latter containing a blank which precedes or follows a sound the type for the corresponding Group 2 adjacent sound. Thus, for the fourth row of Schedule IA the figures entered are changed to those of the second row with the type either remaining the same as for consonants of class 1 and vowels of class 3, or being slightly shifted as in other cases. Similarly, rows 8 and 12 become the same as rows 6 and 10, while rows 13, 14, 15 and 16 become the same as rows 5, 6, 7 and 6, respectively. In going from Schedules IA and IB to Schedule II, for the cases involving a single blank, approximately half of the influences are altered by one physical unit, such as at the beginning of the sound in selecting a type 2 vowel instead of a type 5 vowel. A shift at both ends occurs only for the case of blanks both preceding and following the sound as in row 16 and then only for the seven vowels of class 1 and class 2, with no change for the consonants and the four vowels of class 3. All these alterations have slight effect for two reasons: first, because only the sounds next to a silent space are altered and in normal speaking such silent intervals usually are found after several words at the time breathing occurs, that is, they represent a very small portion of the text; and second, because when there is a silent interval the vocal organs relax to a sort of average position which corresponds crudely to a sort of average formant condition so that speech corresponding to the silent interval having medium hub (formant position) resembles speech as many people do produce it, and in all other cases the shift is the minimum. Moreover, articulation tests indicate that a single sound is not observed very precisely, the listener's recognition of it being rather on a pattern basis, the context supplying important clues as to the actual words or phrases spoken.

The number of magnetic heads needed for the general circuits shown in Figs. 5, 6 and 7 is 496 as stated above. This number can be reduced to 110 by arranging the circuit so that the same sound is recovered from a single sound track on the drum instead of from one of several duplicate records provided to round out the 16×31 rectangular array. Thus for each of the seven consonant sounds, l, s, z, r, t, ʃ, ʒ, a single tape or a total of 7 is needed as against 112 needed for the circuits of Figs. 5, 6 and 7. So a tape recording can be placed, for instance, on the top drum and, for the other horizontal leads, connections can be made to the pickup head which registers with this tape instead of to heads which register with repeated copies of this tape placed on the other fifteen drums. When this connection to the common head is made, however, all leads going rightward to the first set of relays are connected together so that there is not satisfactory operation for the other sounds where more than a single type must be provided for. This difficulty can be overcome by providing a set of the eight relays shown in Figs. 5, 6 and 7 for each of the five classes (space has been included in the first class as stated) of sounds according to the type that must be provided. The five sets of relays may then be operated in parallel from the pickup fingers working through the perforated influence tape 2 in the same fashion as in Figs. 5, 6, and 7.

What is claimed is:

1. Apparatus for the artificial production of speech-like sounds which comprises for each sound of speech a plurality of records of said speech sound as spoken under a like plurality of conditions which differ from each other in respect of the character of the possible preceding and following sounds, means for generating a succession of discrete code signals each of which is representative of one sound to be reproduced, means for simultaneously examining three successive ones of said code signals, means responsive to the identity of the second one of said recognized signals for selecting all of said plurality of records corresponding to said second of said three successive signals, means for further selecting a single one among said plurality in dependence on the recognized character of the first and third of said code signals, and means for reproducing said finally selected record as an artificial speechlike sound.

2. Apparatus for the artificial production of speechlike sounds which comprises, for each sound of speech, a plurality of records of said speech sound as spoken under a like plurality of conditions which differ, each from the others, in respect of the character of various preceding and following sounds, means for generating a succession of discrete code signals each of which is identified with one sound to be reproduced, means for simultaneously examining three successive pairs of said code signals corresponding to three successive sounds, means for deriving from each of said code signals a first code representation of the identity of said sound and a second code representation of a phonetically significant feature of said sound, said first and second code representations constituting a pair, means responsive to the identity code representation of the second of said three pairs for selecting all of said plurality of records corresponding to said second sound, means responsive to the phonetically significant feature code representation of the first and third of said pairs for further selecting a single one among said plurality in dependence on the characters of the neighbors of said second sound, and means for reproducing said finally selected record as an artificial speech-like sound.

3. Apparatus for the artificial production of speechlike sounds which comprises a source of a sequence of principal and auxiliary signal groups, each group representing a plurality of variants of a single sound of a vocabulary, means for converting the principal signal of each group into all of the variants of the sound which it represents, means controlled by the auxiliary signal of an adjacent group of said sequence for selecting a particular one of said variants, and means for reproducing said selected variant as a sound.

4. Apparatus for the artificial production of speechlike sounds which comprises a source of a sequence of principal and auxiliary signal groups, each group representing a plurality of variants of a single sound of a vocabulary, means for converting the principal signal of each group into all of the variants of the sound which it represents, means controlled by the auxiliary signals of adjacent groups of said sequence for selecting a particular one of said variants, and means for reproducing said selected variant as a sound.

5. Apparatus for the artificial production of speechlike sounds which comprises a source of a sequence of principal and auxiliary signal groups, each group representing a plurality of variants of a single sound of a vocabulary, means for converting the principal signal of each group into all of the variants of the sound which it represents, means controlled by the auxiliary signals of the preceding and succeeding groups of said sequence for selecting a particular one of said variants, and means for reproducing said selected variant as a sound.

6. Apparatus for the artificial production of speechlike sounds which comprises a plurality of records of each sound of an alphabet, the members of said alphabet differing one from another in dependence on the character of an adjacent sound, a source of a sequence of principal and auxiliary signal groups, each group representing a sound of said alphabet, means controlled by the principal signal of each group for selecting the plurality of records of the sound represented by said group, means controlled by the auxiliary signal of an adjacent group for selecting a single record of said plurality, and means for reproducing said selected record as a sound.

7. Apparatus for the artificial production of speechlike sounds which comprises a plurality of records of each sound of an alphabet, the members of said alphabet differing one from another in dependence on the character of adjacent sounds, a source of a sequence of principal and auxiliary signal groups, each group representing a sound of said alphabet and indicating its character, means controlled by the principal signal of each group for selecting the plurality of records of the sound represented by said group, means controlled by the auxiliary signals of adjacent groups for selecting a single record of said plurality in dependence on the characters of adjacent sounds, and means for reproducing said selected record as a sound.

8. Apparatus for the artificial production of speechlike sounds which comprises a plurality of records of each sound of an alphabet, the members of said alphabet differing one from another in dependence on the character of preceding and succeeding sounds, a source of a sequence of principal and auxiliary signal groups, each group representing a sound of said alphabet and indicating its character, means controlled by the principal signal of each group for selecting the plurality of records of the sound represented by said group, means controlled by the auxiliary signals of preceding and succeeding groups for selecting a single record of said plurality in dependence on the characters of preceding and succeeding sounds, and means for reproducing said selected record as a sound.

References Cited in the file of this patent

UNITED STATES PATENTS

| | | |
|---|---|---|
| 2,194,298 | Dudley | Mar. 19, 1940 |
| 2,540,660 | Dreyfus | Feb. 6, 1951 |
| 2,613,273 | Kalfaian | Oct. 7, 1952 |